INVENTOR.
JAMES H. BLOW, JR.

April 22, 1969  J. H. BLOW, JR  3,439,983
MICROFILM COPIER DOUBLE INPUT
Filed April 1, 1966

INVENTOR.
JAMES H. BLOW, JR.
BY
ATTORNEYS

United States Patent Office 3,439,983
Patented Apr. 22, 1969

3,439,983
MICROFILM COPIER DOUBLE INPUT
James H. Blow, Jr., Rochester, N.Y., assignor to Xerox Corporation, Rochester, N.Y., a corporation of New York
Filed Apr. 1, 1966, Ser. No. 539,428
Int. Cl. G03b 27/32; G03g 13/00; B41b 23/00
U.S. Cl. 355—8                                8 Claims

ABSTRACT OF THE DISCLOSURE

An apparatus for producing copy from simultaneously imaged multiple inputs. One imaging system utilizes projected data and another, reflected data to form images at a plane. An optical system is arranged between this plane and a photosensitive surface to effect reproduction of both data inputs.

---

This invention relates in general to forms copying and in particular to improved apparatus for simultaneously imaging from multiple inputs. More specifically, the invention relates to an improved apparatus for causing an enlarged micro-sized image to be formed into a reproducible composite object through a Fresnel lens with an opaque document at the object plane of a conventional "office copier."

Electrostatography encompasses the entire field of forming and utilizing latent electrostatic charge patterns to record and reproduce patterns in viewable form. For the purposes of this disclosure an "office copier" only refers to that type of office copying apparatus with a platen capable of accommodating three dimensional objects and using any process to make copies from original documents.

Since electrostatography was disclosed, a variety of machines and devices have been proposed to incorporate the electrostatographic processes in a manner to form copies of documents on a commercial basis. For the most part, each of such devices has been specifically designed to the solution of a particular reproduction problem, and for the most part, has been limited to the particular use intended. Thus, for example, machines are presently in wide commercial use for the continuous high-speed enlargement and copying of microfilm and for reproducing from opaque originals. These machines are incapable, presently, of reproducing copies from microfilm and from opaque originals simultaneously, in other words, composite reproduction.

One of the most commercially successful of the electrostatographic machines is that disclosed in Mayo Patent 3,062,109 issued on Nov. 6, 1962. This machine has been commercially used for reproducing from opaque originals which are placed on a platen on its desklike top. As useful as this machine is, as evidenced by its commercial acceptance, it cannot be used to reproduce electrostatographic copies from microfilm input or from microfilm simultaneously and in conjunction with an opaque original. This is because it has been difficult to provide adequate and uniform illumination of the enlarged microfilm image across the object plane, of electrostatographic devices designed to produce copies from opaque originals. The value of a machine capable of reproducing simultaneously from both inputs is manifest. Its use in such operations as addressing form letters, inserting variable information into standard forms, purchase orders, etc., show but a few of the many uses and needs for an "office copier" with the capabilities that this invention enables such an apparatus to attain.

The present invention is for use in an attachment to an "office copier" machine originally designed to produce copies from opaque originals. If the machine contains a platen capable of accommodating three dimensional objects, it can be equipped with an attachment, incorporating this invention whereby the "office copier" will be capable of producing single copies from light rays of projected image data and reflective data inputs simultaneously and in composite form. The projected image would preferably be a microfilm input. It could be in roll form for rapid change of micro-sized data. However, the microfilm may be in the form of individually mounted frames, or mounted on processing cards, or for that matter in any other form of microfilm support.

Of course, there are existing machines for producing enlarged copies from microfilm inputs; however, these machines are incapable of attachment to other existing "office copiers" which are capable of accommodating a reflective object such as an opaque master or document. These existing machines are not adapted to produce single copies from multiple image producing devices where one device projects film image data and the other projects reflective image data.

It is therefore an object of this invention to improve reproduction apparatus for reproducing composite copies from simultaneously applied multiple inputs.

Another object of this invention is to improve machines for reproducing copies of forms while easily inserting in a composite manner into said forms some selected variable data.

A further object of this invention is to provide a single "office copier" machine capable of simultaneously reproducing from both a projected image and a reflective image.

Yet another object of this invention is to employ inexpensive and easily fabricated optical equipment to enlarge and reproduce electrostatographically with high commercially satisfactory resolution from microfilm originals while simultaneously reproducing from opaque originals placed in a singular optical path.

Still a further object of this invention is to provide an attachment for existing "office copiers" to enable them to reproduce from multiple inputs simultaneously onto a single transfer copy sheet.

These and other objects of the invention are attained by means of an apparatus for selectively projecting microdata image rays through a Fresnel lens and a light dispersing member in selected areas coinciding with transparent areas in a reflective object carrier at the object plane of an "office copier" apparatus to a photosensitive surface of the apparatus, then processing the image formed on the photosensitive surface to form composite copies.

For a better understanding of the invention as well as other objects and further features thereof, reference is had to the following detailed description of the invention to be read in conjunction with the accompanying drawings, wherein.

Referring now to the drawings wherein like numerals designate like elements, there is shown schematically in FIG. 1 an electrostatographic enlarging and copying apparatus adapted to project multiple images in the environment of the platen of an electrostatographic office copier.

Figure 1:
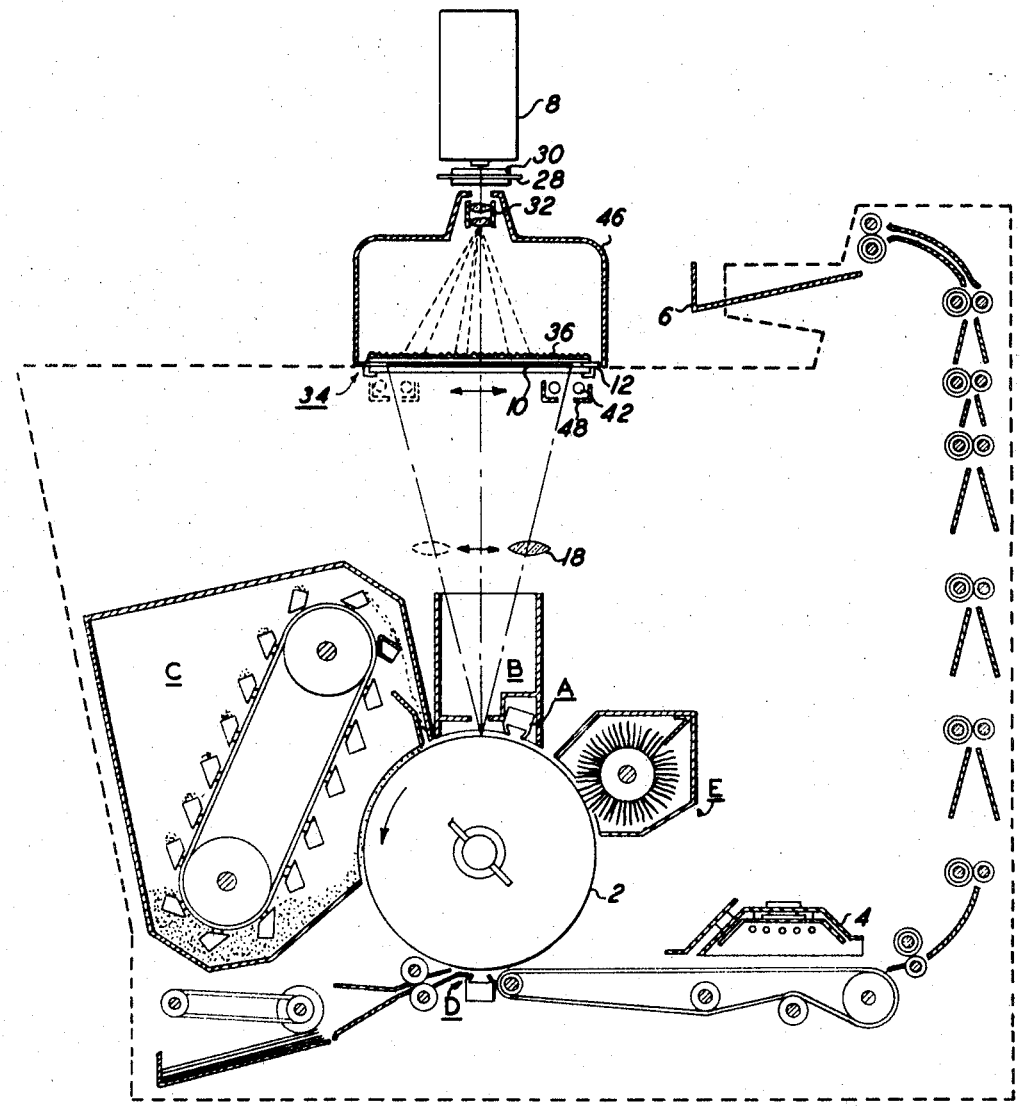
FIG. 1 illustrates schematically an embodiment of a microfilm attachment employing this invention for selectively projecting viewable images on the platen of an electrostatographic copying machine in conjunction with an embodiment of an electrostatographic apparatus adapted for continuous and automatic operation and incorporating an optical scanning mechanism.

The electrostatographic apparatus comprises a xerographic plate formed as a drum 2 and containing a photoconductive layer on a conductive backing. The drum is mounted on a shaft journaled on a suitable frame of the machine to rotate in the direction indicated by the arrow to cause the drum surface sequentially to pass a plurality of electrostatographic processing stations.

For the purpose of the present disclosure, the several xerographic processing stations in the path of movement of the drum surface may be described functionally as follows; a charging station preferably located as indicated by reference character A at which a uniform electrostatic charge is deposited on the photoconductive layer of the drum. An exposure station located preferably as shown by reference character B, at which a light or radiation pattern of copy to be reproduced is projected onto the drum surface to dissipate the drum charge in the exposed portions thereof, thereby forming a latent electrostatic image of copy to be reproduced.

Adjacent to the exposure station is a developing station C, whereat the latent electrostatic image is developed by cascading an electrostatic powder over the drum forming a powder image corresponding to the latent electrostatic image on the drum. Next adjacent to the developing station is the image transfer station D, where the powder image is electrostatically transferred from the drum surface to a transfer material or support surface. The powder image on the transfer material may be fused thereto by a fuser 4 and then transported to the copy holder 6.

The final station E is a drum cleaning and discharge station to prepare the drum surface for the next cycle. For a more complete and detailed description of the automatic apparatus referred to schematically above, see Mayo et al. Patent No. 3,062,109 issued Nov. 6, 1962.

At the exposure station B, and more specifically relating to the improvement in composite multiple imaging in conjunction with electrostatographic reproduction, is a projection imager 8 and a reflective data carrier 10 both of which together form a composite object at a predetermined plane on platen 12 for electrostatographic reproduction by the "office copier." The reflective data carrier is preferably an opaque master original 14 with reproducible data 40 thereon and must possess therein an aperture or several apertures 16 such that image light rays from the projection imager 8 may be projected therethrough to the lens 18 of the "office copier."

The projection imager 8 is preferably a microfilm enlarger and imaging apparatus necessary to form a reproducible image on the drum 2 from a viewable projection at platen 12. The projector may contain a lamp 20 with reflector 22 to intensify the light through condenser lens 24 and a blower 26 to cool lamp 20. The light from the lamp 20 passes through a strip of microfilm 28 held in the film gate 30 causing the image on the microfilm to pass through an objective lens 32 for imaging as an object close above the platen of the "office copier."

The object viewed by the "office copier" is the combination of image light rays passing through the platen 12. These image rays are formed by a plurality of imaging systems which together form a composite object for the "office copier" in a predetermined object plane immediately above the platen 12. This object plane is comprised of three elements: a Fresnel lens 36, a light dispersing member 38 and the reflective data carrier 10. The Fresnel lens 36 may encompass the entire area capable of being struck by light from the microfilm projection system or it may be selectively pre-positioned as in FIGS. 2 and 3 to accommodate specialized or standard forms to be reproduced as a composite. Intimately contacting the Fresnel lens is a light dispersing member such as a piece of ground glass 38. The Fresnel lens and the light dispersing member are all that is necessary to form a reproducible image on the photosensitive surface of the "office copier" from the microfilm projection system. Thus, the entire projection imaging system forming image light rays of enlarged micro-sized data at the platen 12 including the Fresnel lens 36 and light dispersing member 38, may be formed into a single portable unit housed in a container 46 which can easily be attached to or removed from an "office copier" with a platen thereon.

The reflective data carrier is located between the portable projection system housed in container 46 and the platen itself. The reflective data carrier 10 may be an opaque master 14 with apertures 16 therein placed such that the image light rays of the projected microfilm approximately coincide with the apertures 16 and pass therethrough. The reflective data carrier contains data 40 which is made reproducible to the "office copier" machine by the reflected light supplied by the scanning lamps 42. The illumination from the scanning lamps is not sufficient to materially detract from the micro-data light rays passing through platen 12 even though it is sufficient to illuminate the image data on the opaque master for proper discharge of the photosensitive layer of the "office copier" device.

Figure 3:
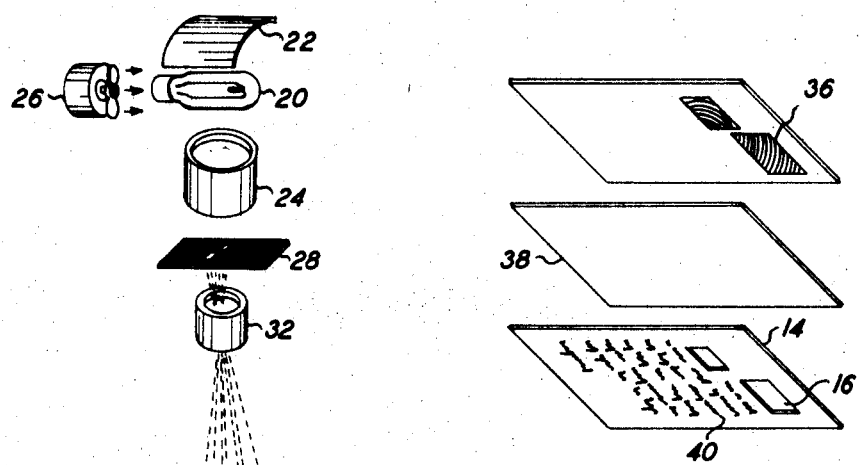
FIG. 3 is an exploded view of the image receptor as viewed from the platen of the "office copier" machine.
Figure 2:
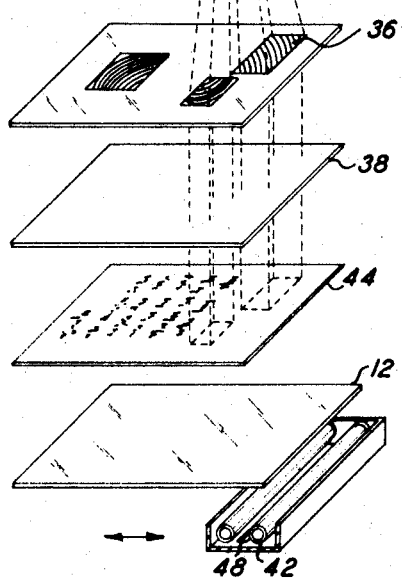
FIG. 2 is an exploded view of a projection system, platen, and copier object plane.

In place of an opaque master 14 with apertures therein, as shown in FIG. 3, the reflective portion of the composite image formed on the drum 2 may comprise a transparent material 44 having image data selectivley positioned thereon so as to be displaced relative to the projected image light rays as they strike the transparent material. The reproduction of the composite formed by both the projected image and the data on the transparency as shown in FIG. 2 will be of acceptable contrast since the non-image areas exposed to the illumination of the scan lamps 42 will reflect as illuminated areas or white areas to the photosensitive member of the "office copier" because of the reflection of the light rays of the scan lamps from the rear surfaces of the light dispersing member 38.

In the system using a microfilm enlarger-projector and an opaque master with apertures selectively placed therein, it is preferable to form the microfilm original such that the light rays striking in the rear of the opaque master will illuminate a slightly larger area than the apertures in the opaque master. This will minimize the reproduction of the circumferential edges of the apertures as lines in the resulting copies from the machine. The light on this fringe area will not be detrimental to the image on the opaque master nor will it interfere with the enlarged micro-data image presented at the image receptor.

The Fresnel lens has the general characteristics of being composites of small, recurring, light deflecting elements that will, as an entire unit, perform to achieve a distribution of light over a predetermined area. It serves the same function as a convex field lens. Neither the material of which the lens is composed nor the method of manufacture is important for the invention herein.

The object plane of the "office copier" reproduction system and the image plane of the microfilm projection system are preferably slightly above the platen 12 and coincide. The enlarged microfilm image on the light dispersing member 38 is protected from extraneous light by container 46 adapted to position the projection system such that the image falls substantially over platen 12 and substantially within those portions of the composite form prepared to accept the various data images supplied by the microfilm.

Container 46 further serves as a housing for the portable microfilm enlarging and imaging apparatus. The system, therefore, directs an enlarged image of micro-sized data obtained from the microfilm original to a light dispersing material on the platen of the "office copier" through a Fresnel lens both of which are attached to the container and are removed with it.

As for the actual reproduction of the composite formed above platen 12 of the "office copier" the composite is scanned by the scanning lamps 42 and is then viewed through a scanning slit 48 having an aperture therein extending across the entire image on the platen by lens 18. For a more detailed and complete description of a preferred embodiment of an electrostatographic scanning apparatus, see Rutkus et al. Patent No. 3,062,095 issued Nov. 6, 1962.

As shown in FIG. 2, the image rays leaving the projection system at objective lens 32 diverge, causing an enlargement of the projected image of microfilm. However, the light rays leaving the light dispersing material on which this image is formed are converging rays such that the light rays are substantially directed to the "office copier" scanning lens 18 as shown in FIG. 1. This is caused by the Fresnel lens 36 without which the light rays forming the image on the light dispersing material at the platen would continue through, somewhat scattered but generally in a diverging manner as they leave the objective lens. Much of these light rays would be unusuable to the "office copier" system viewing the image formed on its objective plane, since only that portion of light rays passing through the scanning lens 18 will expose the photosensitive surface of the "copier" machine to form a latent pattern comparable to the image rays traversing the platen 12.

The composite formed above the platen may be in any form with any combination of data that may be desired by the user nad may be formed by more than two inputs. Merely changing the projected data input or the apertures in the opaque master, or the location of data on the transparent master will be all that is necessary to change the composition of the form to be reproduced on a single transfer sheet or copy. Although the forms shown in the drawings are basically letter writing forms they may be of any composite or shape desirable. The speed and efficiency of the system for making multiple runs with common and variable data on all of the sheets is dependent upon the speed of the "office copier" and the co-ordination between it and the microfilm projector supplying the variable information.

While the invention has been described with reference to the structure disclosed herein, it is not confined to the details set forth; although the examples and description emphasis is on electrostatographic machines, its use with other processes of copying is to be realized; and this application is intended to cover such modifications or changes as may come within the purpose of the improvement of the scope of the following claims.

What is claimed is:

1. A reproduction system for producing copy from simultaneously imaged multiple inputs, such system having a photosensitive surface adapted for receiving image rays of the multiple inputs and a processing system for producing copies therefrom, comprising:
   a plurality of imaging systems at least one being a projected data input system and one a reflective data input system and adapted to form images at a predetermined plane,
   and a projection system optically arranged between said plane and said surface being adapted to direct the images at said predetermined plane simultaneously to the photosensitive surface and thereby effect the reproduction of single copies containing the combined data of said multiple inputs.

2. The apparatus of claim 1, wherein, said projected data input system includes a microfilm projector adapted to present an enlarged micro-sized data image at the predetermined plane.

3. The apparatus of claim 1, said plurality of imaging systems having further associated therewith:
   a light dispersing member arranged in the optical axis of said projected data input system,
   a Fresnel lens adapted to be selectively arranged to contact said light dispersing member at a point where a projected image produced by said projected data input system strikes said light dispersing member,
   a reflectable data carrier having a transparent area in approximate alignment with said Fresnel lens for permitting the passage of light rays from the projected image input through its surface,
   said light dispersing member, Fresnel lens, and reflectable data carrier being located at the predetermined plane.

4. The apparatus of claim 1, wherein one of said imaging systems comprises an opaque master having at least one transparent area formed therein and arranged such that said area approximately coincides with the projected image striking the light dispersing member thereby forming a composite of the projected image and the reflective data from the opaque master, all of which is projected to a photosensitive surface.

5. The apparatus of claim 1 wherein the reflectable data carrier comprises a transparent material with data thereon, wherein the data is displaced relative to the projected image light rays striking the transparent material, thereby forming a composite of the projected image and the reflected data from the transparent material, all of which is projected to a photosensitive surface.

6. The apparatus of claim 4, wherein the area of the Fresnel lens and the light rays projected from the projected image input overlap the transparent area contained in the opaque master.

7. The apparatus of claim 1 wherein said projection system includes means to scan said predetermined plane and project a flowing image of data thereon toward the photosensitive surface, means to move the photosensitive surface to accept the flowing image in rolling contact therewith.

8. The apparatus of claim 1 wherein said single copy output is large relative to said projected data input.

References Cited

UNITED STATES PATENTS 2,515,862 7/1950 Carlton et al. _____ 95—4.5 X
2,931,027 3/1960 Blefary et al. _____ 95—4.5 X NORTON ANSHER, Primary Examiner.

R. A. WINTERCORN, Assistant Examiner.

U.S. Cl. X.R.

95—1.7, 4.5; 355—11